United States Patent [19]
Smith et al.

[11] 3,870,901
[45] Mar. 11, 1975

[54] METHOD AND APPARATUS FOR MAINTAINING THE CHARGE ON A STORAGE NODE OF A MOS CIRCUIT

[75] Inventors: Kent F. Smith, Salt Lake City; Robert J. Huber, Bountiful, both of Utah

[73] Assignee: General Instrument Corporation, Newark, N.J.

[22] Filed: Dec. 10, 1973

[21] Appl. No.: 423,422

[52] U.S. Cl. ................ 307/238, 307/214, 307/279, 307/304, 340/173 AM, 340/173 FF
[51] Int. Cl.... H03k 3/286, H03k 3/33, G11c 11/38
[58] Field of Search ........... 307/205, 214, 238, 279, 307/304; 340/173 AM, 173 FF

[56] References Cited

UNITED STATES PATENTS

| | | | |
|---|---|---|---|
| 3,502,909 | 3/1970 | Christensen et al. | 307/214 X |
| 3,518,635 | 6/1970 | Cole et al. | 307/238 X |
| 3,579,204 | 5/1971 | Lincoln | 307/279 X |
| 3,621,302 | 11/1971 | Pricer | 307/238 X |
| 3,700,981 | 10/1972 | Masuhara et al. | 307/304 X |
| 3,702,990 | 11/1972 | Ross | 307/238 X |
| 3,765,003 | 10/1973 | Paivinen et al. | 340/173 DR UX |

OTHER PUBLICATIONS

Baitinger, "Self-restoring six-device FET Memory Cell," IBM Tech. Discl. Bull., Vol. 14, No. 4, pp. 1340–1341, 9/1971.
Pleshko et al., "MOS Transistor Electronic Stabilization of Thresholds," IBM Tech. Discl., Bull., Vol. 10, No. 3, pp. 336–337, 8/1967.
Lohman, "Applications of MOSFET's in Microelectronic," SCP & Solid State Technology (pub.), 3/1966, pp. 23–29.
Baitinger, "Monolithic Storage Cell with FET's," IBM Tech. Discl. Bull., Vol. 14, No. 12, pp. 3640–3641, 5/1972.

*Primary Examiner*—Michael J. Lynch
*Assistant Examiner*—L. N. Anagnos
*Attorney, Agent, or Firm*—Maxwell James

[57] ABSTRACT

Method and apparatus for maintaining the charge on a storage node of a MOS circuit of the type having a depletion mode transistor as a load resistor situated between a voltage source and a storage node. The voltage level of the storage node determines the output of the circuit. The storage node is charged to a first voltage level upon the receipt of a given data input to the circuit. The substrate of the circuit is reversed biased to a level sufficient to render the depletion mode transistor nonconducting. This will isolate the storage node and isolation will continue for a time selected to maintain a residual charge of a given magnitude on the storage node if the node was originally charged. The substrate bias is removed to permit the depletion mode transistor to again become conductive. If the residual charge was present on the storage node, the node is permitted to recharge thus returning the node to the first voltage level and re-establishing the output of the circuit. In this way power consumption is minimized while the state of the circuit is maintained.

27 Claims, 3 Drawing Figures

METHOD AND APPARATUS FOR MAINTAINING THE CHARGE ON A STORAGE NODE OF A MOS CIRCUIT

This invention relates to MOS integrated circuits and more particularly to method and apparatus for maintaining the charge on a storage node of a MOS circuit.

It is particularly useful in maintaining the stored information in a MOS random access memory when the power to the memory is removed. A memory utilizing this invention has the advantage of requiring a reduced amount of power to retain the stored information therein during power failure, and therefore the information can be maintained for longer periods with less auxiliary equipment.

MOS random access memories which utilize metal oxide semi-conductor field effect transistors have recently come into extensive use in various computer applications because of their capacity per unit volume, speed and cost. However, these memories do have certain drawbacks, perhaps the most important of which relate to the volatile nature of the storage process. Since the information stored in the memory is retained in the form of a charge on a storage node, this charge, and therefore the stored information, is lost a short time after the power to the device is removed. Since power failures are a common occurrence, it is necessary that some method be devised to prevent the loss of stored information in the event that the power to the memory be shut off for one reason or another.

The usual method for solving the power failure problem for random access memories is to provide auxiliary power sources. The auxiliary power sources, preferably in the form of rechargeable batteries, are used with the memory in such a way that in the event of a power failure, the batteries instantaneously supply enough power to the memory elements to prevent the loss of information thereon. It is therefore obvious that the amount of power consumed by the memory to maintain the stored information is of critical importance. The less power consumed, the longer an auxiliary power source of a given size can keep the memory alive. Further, the less power consumed the smaller and less costly the auxiliary power source need be.

At the present time two categories of MOS random access memories are being utilized. Random access memories of the dynamic type have the advantage of minimum power consumption. This type of memory consumes no DC power and depends entirely on being able to store a charge on an internal capacitor for its operation. However, the dynamic random access memories require sophisticated clocking arrangements. Further, the entire memory must be continually "refreshed" at some periodic rate because the charged capacitors in a dynamic memory decay to ground after a certain period of time, and these charges must be periodically replaced. Moreover, this type of memory must operate from relatively large supply voltages.

The second type, known as a static random access memory, has the advantage of not requiring sophisticated clocking arrangements or refreshing systems. However, this type of memory has the disadvantage of requiring rather high power. Naturally, the higher power requirements of a static type random access memory significantly enhance the problem of preventing information loss during power failures.

MOS field effect transistors themselves can be divided into two classes, enhancement mode and depletion mode. One of the essential characteristics of a depletion mode transistor is that it is normally conductive, i.e., has a low resistance across its output circuit when no bias is applied to the gate, whereas an enhancement mode transistor has a normally higher resistive output circuit in the absence of the appropriate gate bias. Further, the type of charge carriers and the polarity of the bias necessary to mobilize these carriers sufficiently to cause conduction (called the threshold voltage) for each of these classes of transistors depends upon the type of impurities utilized in the fabrication process. Thus, an N-channel depletion mode MOS transistor has a negative threshold voltage. N-channel enhancement mode MOS field effect transistors become conductive when a positive threshold voltage is applied to the control terminal. On the other hand, P-channel depletion mode MOS transistors have a positive threshold voltage and P-channel enhancement mode MOS transistors have a negative threshold voltage.

It is possible to convert a depletion mode transistor into an enhancement mode transistor by applying the appropriate bias to the substrate thereof and thus change a normally conducting transistor into a normally nonconducting transistor. Specifically, if a reverse bias potential of sufficient magnitude is applied to the substrate of a negative threshold N-channel depletion mode transistor, the transistor can be converted to a positive threshold enhancement mode transistor. Since reverse biasing the substrate uses only a small amount of power, this is an efficient way to temporarily change the characteristics of the device. This method is advantageously utilized in the present invention.

The present invention is a method and apparatus for maintaining the charge of a storage node of a MOS circuit. The invention is particularly useful when utilized in a random access memory because the resultant memory is a static-type random access memory which can be used in a dynamic mode of operation when the main power is removed from the memory. Further, this invention incorporates all of the advantages of the static random access memory and some of the advantages of the dynamic random access memory.

It is, therefore, the prime object of the present invention to devise a method and apparatus for maintaining the charge on a storage node of a MOS circuit while requiring minimum power.

It is another object of the present invention to devise a random access memory which does not require sophisticated clocking or refreshing systems, but which requires minimum power during power failure to retain the information stored therein.

In accordance with the present invention, a method and apparatus for maintaining the charge on a storage node of a MOS circuit is provided. The present invention is applicable to a variety of different circuit configurations other than memory cells, such as static shift registers or random logic gates. However, for purposes of illustration of the basic concept involved, the invention is considered in conjunction with a simple inverter circuit. Thereafter, the invention is described in conjunction with a flip-flop circuit utilized as a memory cell in a random access memory to show how the principles involved may be applied advantageously. One possessing ordinary skill in the art will then understand how the present invention can be applied in a multitude of situations.

The MOS circuit in which the present invention is applied utilizes a depletion mode transistor as a load resistor situated between a voltage source and a storage node. A means connected to the input of the circuit is provided to permit the storage node to charge to a voltage level determined by the source if the data input of the circuit is of a given polarity. This means may be in the form of a driver transistor whose output circuit is connected between the storage node and ground.

The storage node may be connected to further circuitry which senses the voltage level of the storage node, such as the control terminal of the driver transistor of a second similar circuit. The voltage level at the storage node determines the output of the circuit. After charging of the storage node (if the appropriate data signal is received) has taken place the substrate of the transistors in the circuit are reverse biased to a level sufficient to render them nonconductive, thus isolating the storage node. The voltage on the storage node is permitted to decay to a residual charge of a given level. The magnitude of the residual charge depends upon the sensitivity of the subsequent circuitry. If the circuitry connected to the storage node includes a driver transistor whose control terminal is tied to the storage node, this voltage level will be at least of sufficient magnitude to affect this transistor in a desired fashion, such as render it conductive. After a time interval sufficient to permit the desired decay, the substrate bias is removed rendering the depletion mode transistor conductive once again. The voltage source will recharge the storage node to its original level via the load transistor as long as the appropriate data input is still present. The driver transistor whose gate is connected to the storage node will also again become conductive because of the charge on the storage node thus preventing the storage node connected to its output circuit from charging. In this way minimum power is consumed while the output of the MOS circuit is reinforced.

If the MOS circuits form inverters which are cross-coupled (i.e., the control terminal of each driver connected to the opposite storage node), the nature of the circuit will permit only one of the two storage nodes to charge in accordance with the data input of the circuit. When the substrate is returned to ground, both storage nodes begin charging through their respective load resistors towards the threshold voltage of the drivers. The node with the residual charge thereon will reach the threshold voltage level before the other node thus turning on the driver transistor whose control terminal is connected thereto before the other driver is turned on. The conductive driver will ground the storage node connected to its output circuit thus preventing the other driver from becoming conductive. The storage node originally charged to a given voltage level will recharge and the other node will be prevented from recharging. Thus the unbalance of charges on the respective storage nodes serve to cause the circuit to return to its original logic state.

This maintenance system is particularly useful for random access memories which utilize flip-flop circuits, although the application of such a system to other MOS circuits will be apparent to those skilled in the art. Since the time for dicharging the storage nodes is much longer than the time for charging these nodes, the total power consumed by the memory in this condition will be orders of magnitude less than the normal power consumption. Further, the nodes may be almost completely discharged during reverse biasing of the substrate, and the cell will still return to the initial state when the reverse bias is removed. This is possible because only a small unbalance in the charges is requred in the flip-flop portion of a random access memory utilizing this system, whereas in the conventional dynamic random access memory, an absolute minimum voltage must be maintained in order for recharging to occur. This is a significant advantage because it means that while conventional dynamic random access memories must operate from relatively high voltage power supplies in order to maintain this minimum voltage after decay occurs, the system of the present invention may operate with low voltage supplies. Thus, the type of memory circuit described herein will find significant application in those cases where, for instance, a single 5-volt power supply is used to power the memory.

To the accomplishment of the above and to such other objects as may hereinafter appear, the present invention relates to method and apparatus for maintaining the charge on a storage node of a MOS circuit, as defined in the appended claims and as described in the specification, taken together with the accompanying drawings in which:

A conventional inverter circuit comprises a transistor which acts as a load resistor connected between a voltage source and a storage node. A driver transistor is connected between the storage node and ground with the control terminal thereof connected to the data input of the circuit. The circuit functions to produce an output at the storage node which has a value opposite that of the input.

If the data input is logic 1 (positive for N-channel transistors, negative for P-channel transistors) the driver is turned on, grounding the storage node and preventing the storage node from charging. On the other hand, if the input is logic 0 (ground), the driver is nonconductive and since the load transistor connects the voltage source to the storage node, a logic 1 output is produced. Thus, the charge stored in the inverter always represents the opposite logic state from the input, i.e., the signal is inverted. However, if two inverter circuits are connected in series, the input data will be inverted twice at the circuit output thus causing the output to be of the same logic state as the input.

Figure 1:
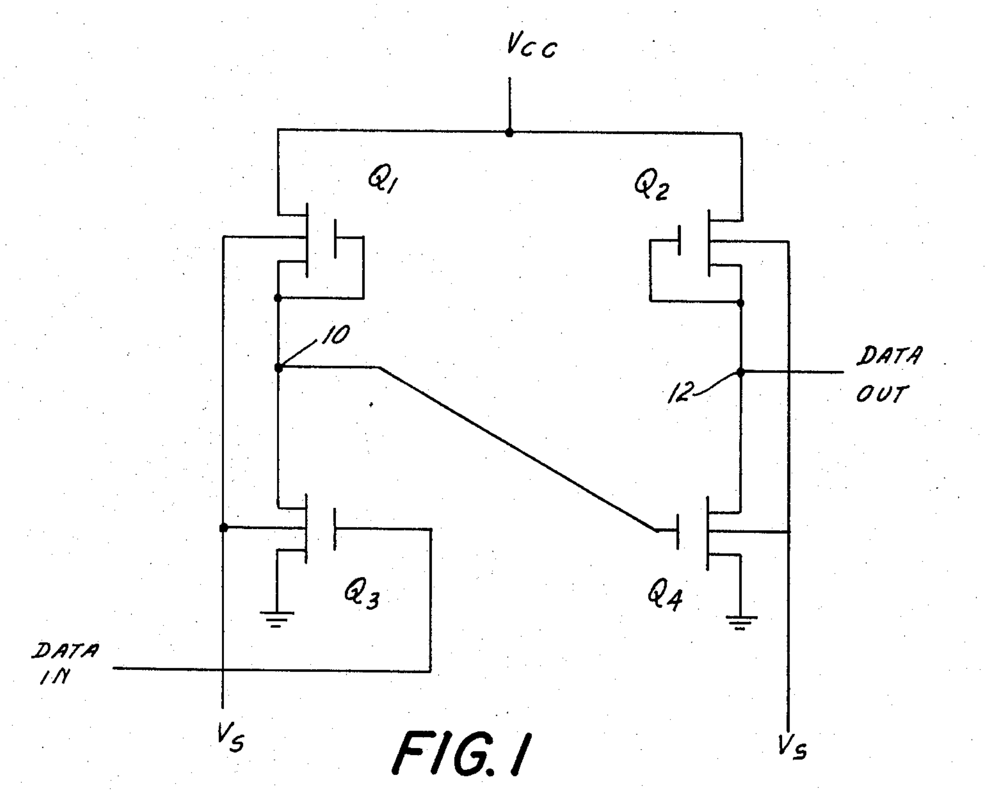
FIG. 1 is a circuit diagram of a MOS circuit comprising a pair of inverters wherein the output of one inverter is connected to the input of the other inverter and wherein the present invention is advantageously utilized to minimize power consumption in the circuit.

FIG. 1 illustrates the use of the present invention in a pair of series connected inverter circuits. Transistors $Q_1$ and $Q_2$ are depletion mode transistors utilized as load resistors between voltage source $V_{cc}$ and the storage nodes 10 and 12 respectively. Driver transistors $Q_3$ and $Q_4$ are connected between ground and nodes 10 and 12 respectively. Input data is applied to the control terminal of transistor $Q_3$. Node 10 is operably connected to the control terminal of transistor $Q_4$. The substrate of each of the transistors is tied to a voltage source which controls the bias $V_s$ thereof. The output of the circuit occurs at storage node 12.

In operation, the input data is supplied to the control terminal of transistor $Q_3$. The input data must be thought of as coming from an internal storage node, that is to say a storage node that is operatively affected by the substrate bias. If this data is insufficient to render transistor $Q_3$ conductive, i.e., logic 0, node 10 will be permitted to charge through transistor $Q_1$. The charge on node 10 will render transistor $Q_4$ conductive thus grounding node 12 and preventing node 12 from charging. To cause the circuit to minimize power consumption, a reverse bias $V_s$ of sufficient magnitude is applied to the substrate of the transistors, thus changing transistors $Q_1$ and $Q_2$ from depletion mode (normally conductive) to enhancement mode (normally nonconductive) transistors, and causing transistors $Q_3$ and $Q_4$ to become nonconductive. This serves to isolate storage nodes 10 and 12 respectively.

After a time less than the time it takes the charge on storage node 10 to decay to a given level (and for every circuit there will be some characteristic time for this to occur), the reverse bias on the substrate will be removed, e.g., the substrates of the transistors will again be grounded. Transistors $Q_1$ and $Q_2$ will return to the conductive state. The given level of residual charge maintained on the storage node is dependent upon the circuitry connected to the output of the inverter. In this case it must be greater than the threshold voltage of transistor $Q_4$ such that transistor $Q_4$ is rendered conductive when the bias Vs is removed. The residual charge on node 10 in combination with the charge from $V_{cc}$ transferred to node 10 by transistor $Q_1$ (which is now conductive) will cause transistor $Q_4$ to remain conductive. The conductivity of transistor $Q_4$ prevents node 12 from charging and thus the voltage source recharges only node 10. The output of the circuit is therefore retained at its original voltage level.

If, on the other hand, the data input had been logic 1, node 10 would be grounded thus keeping transistor $Q_4$ off and permitting node 12 to charge. When the substrate of the transistors was reversed biased, node 10 will discharge toward the reverse substrate voltage. When Vs is again brought to ground, transistor $Q_3$ will return to the conductive state and transistor $Q_4$ will still be off thus permitting node 12 to charge. Again, the output of the circuit will return to its original voltage state.

It can therefore be seen that the logic state of the circuit is preserved even though power is consumed only intermittently. since only minimal power is consumed in reverse biasing the substrate, a great deal less power is consumed than with conventional methods.

Figure 2:
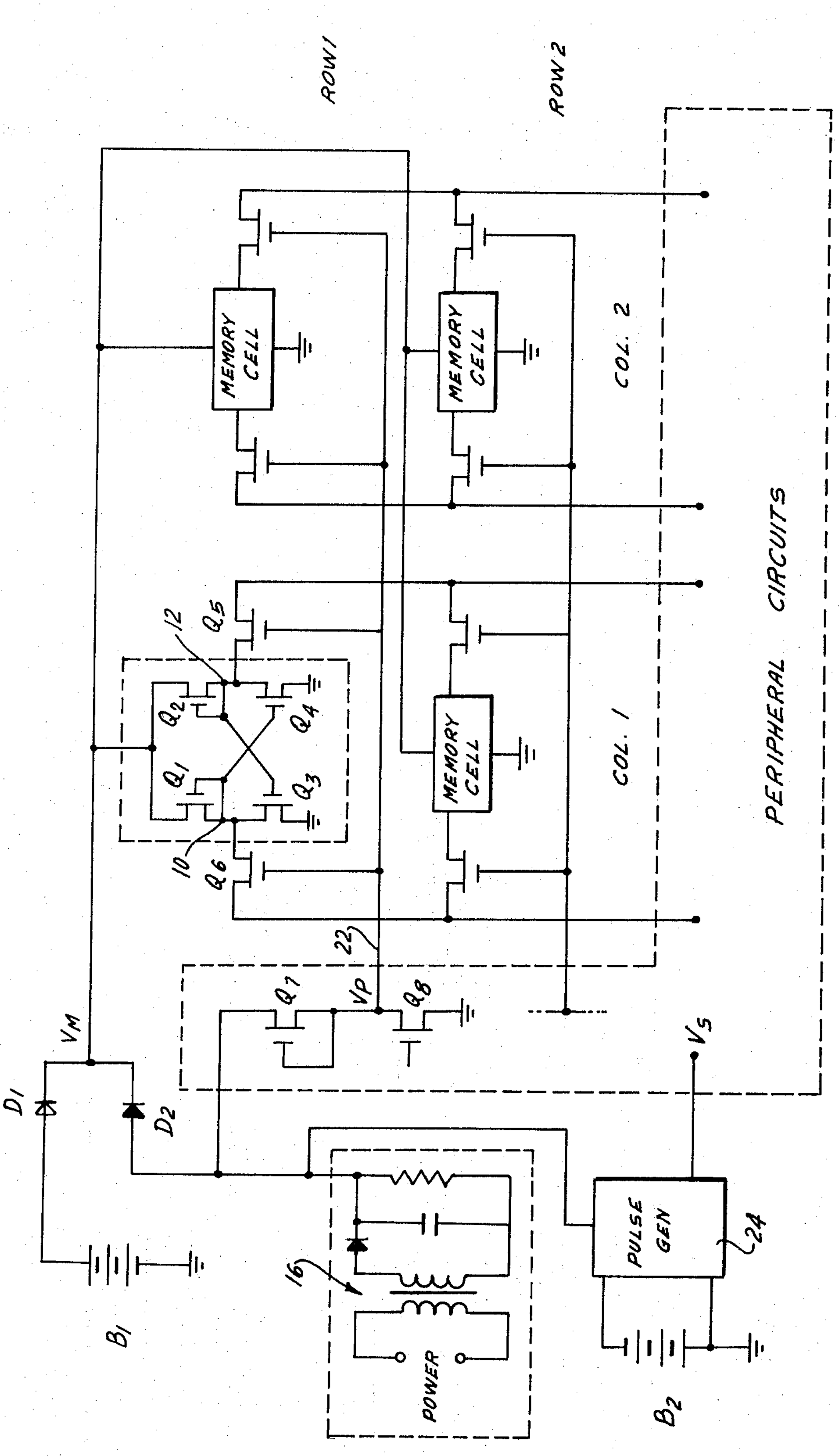
FIG. 2 is a schematic diagram of a random access memory showing the application of a preferred embodiment of the present invention.

FIG. 2 shows a schematic diagram of a random access memory utilizing the system of the present invention. The diagram shows a memory with four memory cells, the one in the upper left-hand corner being shown in detail. However, it is obvious that as many memory cells as desired can be used in the memory. The peripheral circuitry which is utilized to select the addressed memory cells by actuating the appropriate row and column inputs is not shown in detail (except for a single row select circuit) as it forms no part of the present invention and may take many forms well known in the art.

In the normal operating mode, power for the memory $V_M$ is supplied by a primary power source, generally designated 16, of conventional nature. In this operating mode the memory acts as conventional static random access memories, the operation of which is well known in the art.

The basic building blocks of many memory circuits are flip-flop circuits. As shown in FIG. 2, these circuits basically consist of two cross-coupled inverter circuits each having a driver and a load resistor transistor with a storage node therebetween. The gate of each driver is connected to the storage node of the opposite inverter. Thus either one or the other (but not both) of the driver transistors is rendered conductive by the charge on the storage node of the opposite inverter causing the storage node associated therewith to be at ground level. Which of the storage nodes is charged depends upon the input of the circuit. The "on" or "off" (logic 1 or logic 0) state of the driver transistors determines or defines the information stored. This in turn is determined by the charge on the storage nodes. As long as this charge is maintained, the information is retained in the memory.

Each memory cell shown herein consists of six transistors, $Q_1$ through $Q_6$ in a flip-flop arrangement. Transistors $Q_1$ and $Q_2$ are depletion mode transistors which act as load resistors and are connected to receive the supply voltage $V_M$. Transistors $Q_3$, $Q_4$, $Q_5$ and $Q_6$ are enhancement mode transistors. Storage node 10 is operably connected between transistors $Q_1$ and $Q_3$. Likewise, storage node 12 is operably connected between transistors $Q_2$ and $Q_4$. Row selection is accomplished by means of transistors $Q_7$ and $Q_8$ which are operably connected to the gates of transistors $Q_5$ and $Q_6$ by line 22. Line 22 carries the row select voltage $V_P$ from primary power source 16 to each of the memory cells if the cells in that row are addressed.

During a power failure the primary power supply 16 is interrupted and $V_P$ goes to ground. Prior to power removal, the memory cells had been supplied voltage $V_M$ via diode $D_2$. When power source 16 goes off, $D_2$ also turns off and diode $D_1$ turns on. Battery $B_1$ acts as an auxiliary voltage or power source which feeds the cells $V_M$ via diode $D_1$ when primary source 16 shuts down. When $V_P$ goes to ground, the row selector circuitry also goes to ground because transistor $Q_7$ is a depletion mode transistor. Thus, the gates of $Q_5$ and $Q_6$ are grounded and $Q_5$ and $Q_6$ are turned off.

A pulse generator 24, which is powered by a second auxiliary power source $B_2$, detects the grounding of $V_P$. After a short time delay $T_1$, pulse generator 24 begins to generate a series of negative pulses $V_S$ to the substrate of the semi-conductor chip upon whch the memory cell is located.

Time delay $T_1$ is important because nodes 10 and 12 may not have fully charged to the power supply voltage $V_M$ at the time $V_P$ goes to ground. Thus, $T_1$ allows either node 10 or 12 to completely charge to the voltage level $V_M$ before the first negative pulse from pulse generator 24 is applied to the substrate. It is also necessary for $V_P$ to be discharged to ground thus turning $Q_5$ and $Q_6$ off which isolates the cell.

Figure 3:
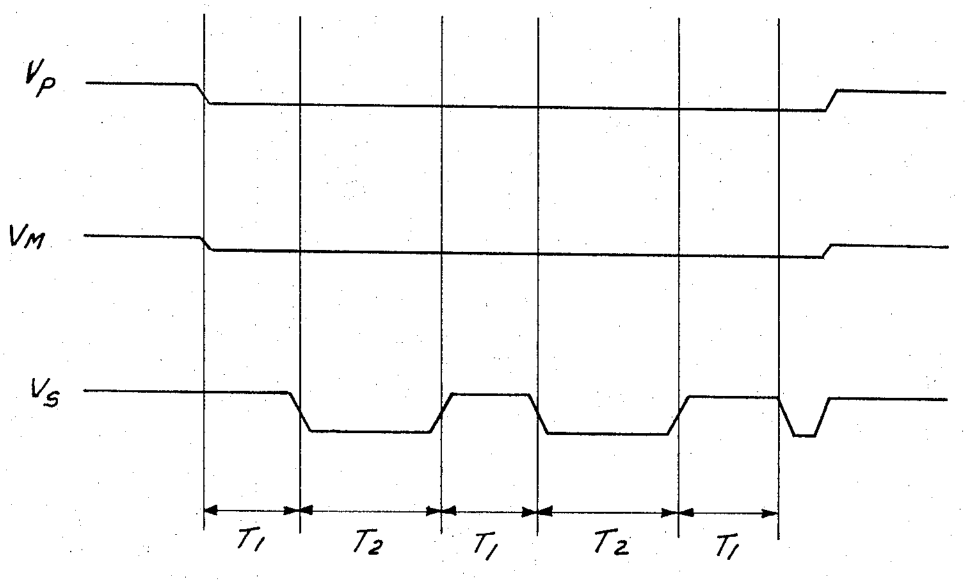
FIG. 3 is a graphic representation of the voltages supplied to the memory during operation of the preferred embodiment of the present invention.

After the termination of interval $T_1$, pulse generator 24 generates a negative pulse which, when applied to the transistor substrate, is sufficient to reverse bias both transistors $Q_1$ and $Q_2$ (see FIG. 3). The reverse biasing of transistors $Q_1$ and $Q_2$ serve to isolate nodes 10 and 12, respectively. During isolation, nodes 10 and 12 begin to discharge or decay towards the substrate voltage. After a time $T_2$ (which is the pulse width of the negative pulse generated by pulse generator 24), the substrate is returned to ground, thus removing the reverse bias thereon (see FIG. 3). The pulse width must be selected such that it is slightly less than the decay time of the nodes 10 and 12, so that a small residual charge on the storage node 10 which was originally at the logic 1 state will remain on the nodes after the pulse has terminated.

When the substrate is returned to ground, the depletion mode transistors will again become conductive. The residual charge present on one of the storage nodes in combination with the charge supplied to this node by $B_1$ through the interposed load transistor will cause the driver transistor whose gate is connected to that storage node to be actuated before the other driver transistor. The actuation of this driver transistor will permit the auxiliary voltage source to recharge that storage node to Vm and prevent the other storage node from charging. In other words, when the substrate of the circuit is returned to ground, transistors $Q_1$ and $Q_2$ both become conductive and nodes 10 and 12 both start charging toward Vm. However, either node 10 or 12 still has some residual charge and thus one node will reach a voltage sufficient to turn on the driver transistor whose gate is connected to it before the other driver transistor is turned on, and the cell will be returned to the same logic state as before. For example, if storage node 10 has a small residual charge thereon, it will turn on transistor $Q_4$ before transistor$Q_3$ is turned on, thus grounding node 12 and keeping transistor $Q_3$ off. Transistors $Q_1$ and $Q_2$ are conductive, thus connecting node 10 and 12 with auxiliary power source $B_1$. However, only node 10 will charge. Node 12 will not charge because transistor $Q_4$ is conductive. In this way, the memory cell "refreshes" itself each time the substrate voltage $V_S$ returns to ground. The sequence of reverse biasing the substrate and then refreshing or recharging the storage node is repeated until the primary power source 16 comes back on again. When this occurs, the pulse generator 24 is disabled and the substrate is returned to ground.

The reduced power requirements of this random access memory during power removal relates to the fact that as the reverse bias is applied to the substrate, the depletion mode transistors become enhancement mode transistors, i.e., a negative voltage threshold N-channel depletion mode transistor becomes a positive threshold voltage N-channel enhancement mode transistor or a positive threshold voltage P-channel depletion mode transistor becvomes a negative threshold voltage P-channel enhancement transistor with the application of the reverse bias. The current, and therefore the power in the circuit under normal operating conditions, is determined by the magnitude of the threshold voltage of a given polarity of the depletion mode transistors. Thus, when a reverse bias is applied to the substrate, the polarity of the threshold reverses, and the current and the power in the cell go to zero. It can be seen that the present invention works equally well for N-channel and P-channel circuits.

If the gates of transistor $Q_5$ and $Q_6$ are returned to ground at the same time that the substrate is reverse biased, transistors $Q_5$ and $Q_6$ also turn off, and nodes 10 and 12 become completely isolated in much the same way as in a dynamic access memory. These nodes will then begin to decay toward the substrate bias. When the substrate is again returned to ground, the flip-flop will come back to its original state provided there is an unbalance of charge still left at nodes 10 and 12. Thus the "refreshing" of all the cells will be accomplished whenever the substrate bias is returned to ground as long as the minimum residual charge representative of the original charge is present on one of the storage nodes. This refreshing must take place periodically and in much the same way as in a dynamic random access memory.

The time for decaying of the charge on nodes 10 and 12 is much longer than the time necessary to charge these nodes. The total power consumed by the memory in the auxiliary power mode will therefore be orders of magnitude less than the normal power consumption. In this way, the information stored in the memory can be maintained during a power failure while consuming a minimum amount of power.

A further advantage of this system over the conventional dynamic random access memory is that nodes 10 and 12 may be almost completely discharged during the reverse biasing of the substrate, and the cell will still refresh itself to the initial state when the substrate is grounded. This occurs since only a small unbalance in the charge between nodes 10 and 12 is required in the flip-flop circuit utilizing the present invention, whereas in the dynamic random access memory an absolute minimum voltage (much higher than necessary in the present invention) must be maintained in order for refreshing to occur. This is a significant difference because it means that conventional dynamic random access memories must operate from a relatively high voltage power supply in order to maintain this minimum voltage after decay occurs. On the other hand, the memory circuit utilizing the present invention may be run with a relatively low voltage power supply, such as five volts.

An attempt to provide an information maintenance system similar to the one described herein has been advanced by the prior art. This sytem utilizes only enhancement mode transistors as load resistors in the flip-flop circuit with the control terminals of these transistors tied to the supply voltage source. In this system, when the power is shut off the enhancement mode load resistors are immediately rendered nonconductive. Through the appropriate arrangement of the other transistors in the flip-flop, the storage nodes are isolated in the same manner as described herein and they begin to discharge towards the substrate. However, in such a system the power supply voltage must be switched to render the enhancement mode load resistor conductive to accomplish the recharging of the storage nodes. This requires a great deal of power. In the system of the present invention only the substrate bias need be switched, which requires a very small amount of current. Therefore, the system of the present invention requires substantially less power.

Further, in the prior art system the storage nodes can only be charged to within one threshold voltage of $V_M$ whereas in the system of the present invention the storage nodes charge to the power supply voltage $V_M$. This is a very significant difference because with low power auxiliary supply voltages, this extra voltage is a large portion of the total voltage which is stored at the storage nodes and thus longer decay times may be tolerated in the circuit of the present invention. Moreover, enhancement mode load resistors take up considerably more space than depletion mode load resistors for a low power-random access memory. Thus, the circuit of the present invention can be manufactured to be physically smaller than the system of the prior art. This is of particular importance in the semiconductor electronics field where size is often a significant factor and especially true in computer memories where smaller size means greater memory capacity for a given volume.

The present invention as applied to random access memories, therefore, provides a random access memory which does not need sophisticated clocking or refreshing systems but which during a power failure can be switched to an auxiliary mode wherein the circuit is periodically refreshed while consuming minimum power. Thus, this circuit has all the advantages of a static random access memory and many of the advantages of a dynamic random access memory.

While the present invention has been herein specifically described only as applied to two types of circuits, it will be apparent that many variations and modifications may be made to the present invention depending upon the type of circuit in which it is utilized. It is intended to cover all of these variations and modifications which fall within the scope of the instant invention as defined in the appended claims.

We claim:

1. Method for maintaining the charge on a storage node of a MOS circuit of the type having a depletion mode transistor as a load resistor situated between a voltage source and the storage node comprising the steps of permitting the storage node to charge to a given voltage upon receipt of a given input signal to the circuit from an internal storage node, reverse biasing the substrate of said transistor to isolate the storage node, permitting the charge on the storage node to decay if the storage node was originally charged and removing the bias on the substrate while some residual charge still remains on said storage node to permit recharging of the storage node if the input signal is still present.

2. The method of claim 1 wherein the step of reverse biasing the substrate does not take place until after a time sufficient for the storage node to charge to the level of the voltage source.

3. The method of claim 1 wherein the step of removing the reverse bias from the substrate is initiated prior to the end of the storage node decay time.

4. A method of maintaining the charge on a storage node of a MOS circuit whose input is connected to an internal storage node, said circuit being of the type having first and second inverter circuits connected in series each of which utilizes a depletion mode transistor as a load device situated between a voltage source and the storage node thereof, the method comprising the steps of charging the storage node of the first inverter to a given voltage level if a data input of a given polarity is present, reverse biasing the substrate to isolate the storage nodes respectively, permitting the charge on the storage node of the first inverter to decay if same was originally charged, and removing the reverse bias to render the depletion mode transistors conductive while some residual charge still remains on said storage node and thereby effective to recharge the storage node of the first inverter if the input signal is still present, said residual charge being effective to prevent charging of the storage node of the second inverter.

5. The method of claim 4 wherein the step of reverse biasing the substrate does not take place until after a time sufficient for the storage node to charge to the level of the voltage source.

6. The method of claim 4 wherein the step of removing the reverse bias from the substrate is initiated prior to the end of the storage node decay time.

7. A method for maintaining the charge on a storage node of a MOS circuit of the type having a pair of cross-coupled inverter subcircuits each of which has a storage node connected between a depletion mode load transistor and a driver transistor, each inverter subcircuit being connected between a voltage source and ground and having the control terminal of its driver transistor connected to the storage node of the other inverter, the method comprising the steps of charging one of the storage nodes in accordance with the input of the circuit, reverse biasing the substrate of the transistors to isolate the storage nodes respectively, maintaining a residual charge on the charged storage node, and removing the reverse bias from the substrate to render the depletion mode transistors conductive and to cause the storage node with residual charge thereon to render conductive the driver transistors whose control terminal is connected thereto thereby preventing the other storage node from recharging, and thus returning the circuit to its original logic state.

8. The method of claim 7 wherein the step of reverse biasing the substrate does not take place until after a time sufficient for the storage node to charge to the level of the voltage source.

9. The method of claim 7 wherein the step of maintaining the residual charge on the storage node comprises initiating the step of removing said reverse bias from the substrate prior to the end of the storage node decay time.

10. A method for reducing the refreshing power requirements of a random access memory during power failure of a primary power source wherein the memory utilizes depletion mode transistors as load resistors in a flip-flop circuit between the respective storage nodes thereof and a voltage source comprising the steps of charging one of the storage nodes in accordance with the input of the memory, sensing the occurrence of a power failure in said primary power source, and, in response thereto, (a) connecting an auxiliary power source to said memory and (b) reverse biasing the substrates of the depletion mode transistors to isolate the respective storage nodes, maintaining a residual charge on the charged storage node and removing said reverse bias from the substrates of the depletion mode transistors to render same conductive to connect the storage nodes to the auxiliary power source thus causing the storage node with the residual charge thereon to actuate the circuit to permit only the residually charged storage node to recharge, and if necessary repeating the application and removal of said reverse bias for as long as the failure of said primary power source continues.

11. The method of claim 10 wherein the steps of applying and removing said reverse bias are performed by generating a series of pulsed signals to the transistor substrate.

12. The method of claim 11 wherein the voltage on said storage node will decay to an inoperative level within a given period of time, the width of said pulse signals being less than said given period of time, whereby a residual charge is maintained on said storage node.

13. The method of claim 12 wherein the voltage on said storage node will charge to an operative level in a given period of time, the time between pulses in said pulsed signal being at least as long as said given period of time.

14. The method of claim 11 wherein the voltage on said storage node will charge to an operative level in a given period of time, the time between pulses in said pulsed signal being at least as long as said given period of time.

15. Circuitry for maintaining the charge on a storage node of a MOS circuit of the type utilizing a depletion mode transistor as a load resitor situated between a voltage source and a storage node comprising means operably connected to the input node of the circuit to effect charging of the storage node by the voltage source upon receipt of a given input signal, means for reverse biasing the substrate of the transistor to isolate the storage node, means for maintaining a residual charge on the storage node if the storage node was originally charged and means for removing the reverse bias from the substrate of the transistor to render the transistor conductive such that the storage node is permitted to recharge if residual charge is present thereon.

16. The circuitry of claim 15 wherein said means for reverse biasing and means for removing the reverse bias comprise a pulse generator operably connected to the substrate of the depletion mode transistor and generating a pulsed signal comprising a series of pulses of predetermined width.

17. Apparatus for maintaining the charge on a storage node of a MOS circuit of the type having a pair of inverters each of which has a depletion mode transistor as a load resistor situated between a voltage source and a storage node and a driver transistor whose output circuit is connected between the storage node and ground, the control terminal of the driver of the first inverter being connected to the circuit input, the control terminal of the driver of the second inverter being connected to the storage node of the first inverter and the storage node of the second inverter being connected to the circuit output, the storage node of said first inverter being charged by said voltage source if an input signal of a given polarity is received by the circuit, said apparatus comprising means for reverse biasing the substrate of the transistors to isolate said storage nodes respectively, means for maintaining a residual charge of a given magnitude on the storage node of said first inverter if same was originally charged, means for removing said bias to render said load transistors conductive and if residual charge was present on the storage node of said first inverter to render the driver transistor of the second inverter conductive thereby preventing the storage node of said second inverter from charging.

18. The apparatus of claim 17 wherein said given magnitude is at least equal to the threshold voltage of the driver of said second inverter.

19. The apparatus of claim 17 wherein the voltage on said storage node will charge to an operative level in a given period of time, the time between pulses in said pulsed signal being at least as long as said given period of time.

20. A random access memory utilizing a flip-flop circuit having reduced power requirements during failure of the primary power source of the type using depletion mode transistors as load resistors connected to the respective storage nodes in the flip-flop circuit, said memory comprising an auxiliary voltage source capable of being connected to the input of the depletion mode transistors to permit charging by said auxiliary voltage source of one of the respective storage nodes to a higher level than the other in accordance with the input of the memory, means for sensing the occurrence of a power failure in the primary power source, means for connecting said auxiliary power source to said memory when a power failure is sensed, means for reverse biasing the substrates of the depletion mode transistors to isolate the respective storage nodes, means for maintaining a residual charge on the storage node charged to a higher level and means for removing said reverse bias from the substrates of the depletion mode transistors to render same conductive such that the storage node having the residual charge thereon is effective to actuate the circuit to prevent charging of the other storage node.

21. The memory of claim 20 wherein the voltage on said storage node will decay to an inoperative level within a given period of time, and wherein said maintaining means comprises timing means for actuating said reverse bias removal means after a time less than said given time period.

22. The memory of claim 21 wherein said substrate reverse biasing means, said substrate bias removal means and said timing means comprise a pulse generator operably connected to the substrate of the depletion mode transistors, said pulse generator generating a pulsed signal comprising a series of pulses of predetermined width.

23. The memory of claim 22 wherein said pulse width is less than the time period necessary for said storage node to decay to an inoperative level.

24. The memory of claim 22 wherein the interval between pulses is at least equal to the time necessary for said storage node to charge to an operative level.

25. The memory of claim 24 wherein said operative level is the auxiliary voltage source voltage.

26. The memory of claim 20 wherein the voltage on said storage node will charge to an operative level within a given period of time, and wherein said substrate reverse biasing means is not actuated until after said given time period.

27. The memory of claim 24 wherein said operative level is the auxilary voltage source voltage.

* * * * *